April 14, 1970   A. M. GRASS   3,505,903
MULTIPLE SPEED DRIVE
Filed April 8, 1968
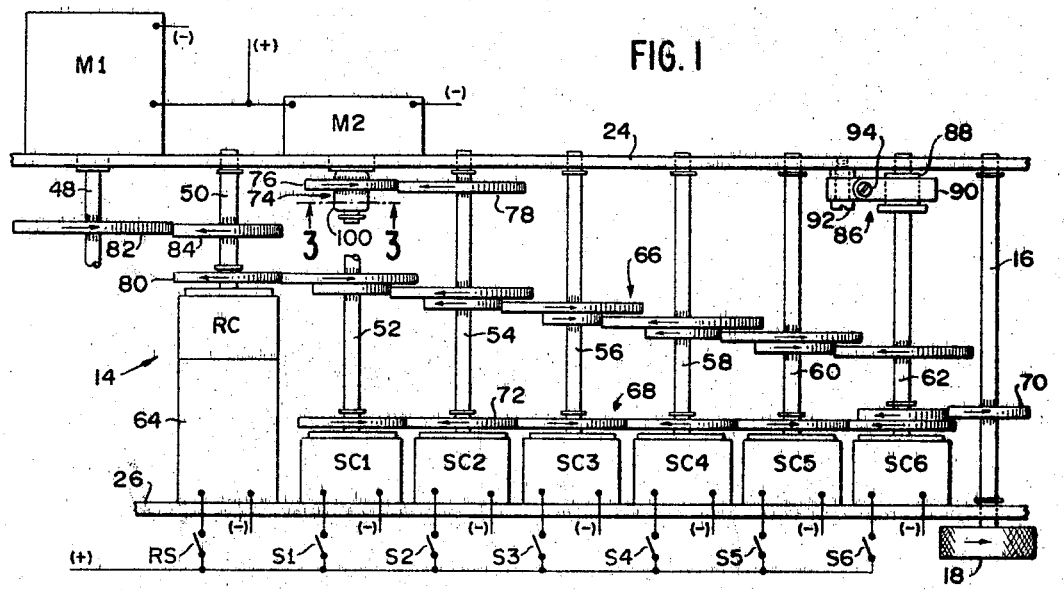
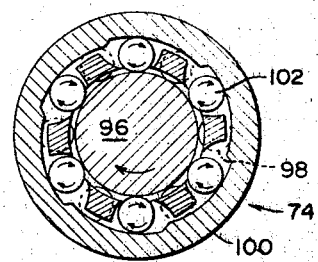
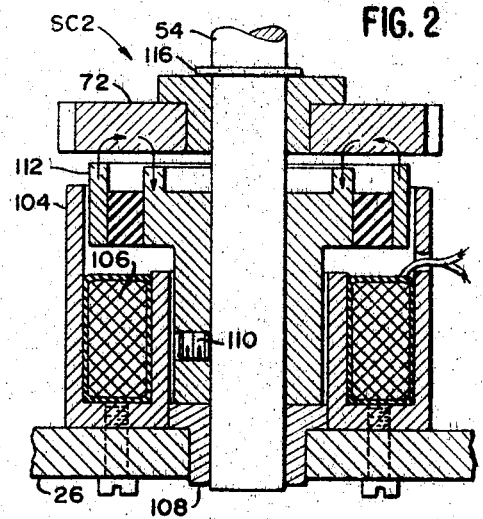
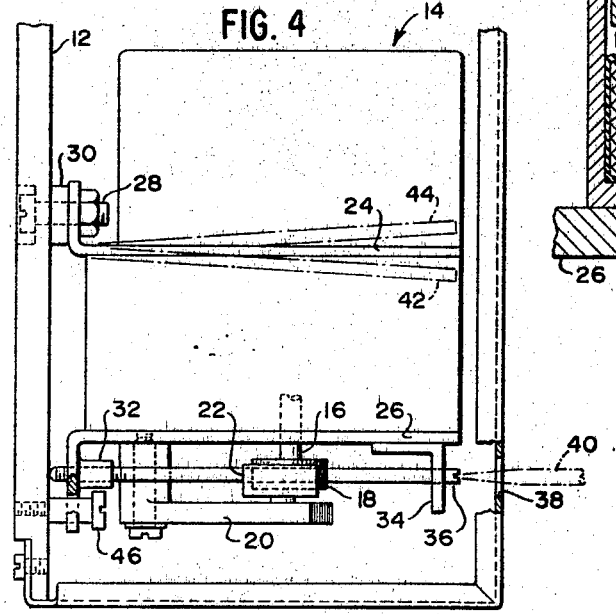
INVENTOR.
ALBERT M. GRASS
BY
ATTORNEYS

United States Patent Office 3,505,903
Patented Apr. 14, 1970

3,505,903
MULTIPLE SPEED DRIVE
Albert M. Grass, 101 Old Colony Ave.,
Quincy, Mass. 02170
Filed Apr. 8, 1968, Ser. No. 719,519
Int. Cl. F16h 37/06
U.S. Cl. 74—661      5 Claims

ABSTRACT OF THE DISCLOSURE

A multiple-speed drive for a strip chart recorder has a number of shafts interconnected by a train of spur gears and rotated at different speeds. Plural continuously rotating motors are adapted with overrunning clutch means to import a selected speed to the shafts. A second train of mutually engaged spur gears are freely turnable on the shafts, each gear having a clutch for selective engagement with its shaft, the train being connected to an output drive wheel.

BACKGROUND OF THE INVENTION

The field of this invention generally comprises geared drive means adapted for rotating an output member at any of several speeds. More particularly, the invention is concerned with a drive having means for selection of any one of several discrete, predetermined speeds.

This type of drive has application to strip chart recorders, particularly the type having a drive for feeding a strip or sheet at a predetermined rate relative to a recording pen or the like mounted on the recorder and responsive to an output function. In a typical application the longitudinal dimension of the strip chart, that is the direction of relative motion, is scaled in units of time, and for this reason it is important that the drive rotates at the selected speed with minimal speed variation.

A further and important object of a multiple speed drive of the foregoing type is to provide the capability of changing from one selected drive speed to another as nearly instantaneously as possible, and preferably within a few milliseconds. The object has not been well attained in many of the drives hitherto used for recording various time-variable phenomena. As a result, there is a transition period during which the drive changes from one steady-state speed to another, and within which measurements of output data cannot be as accurately correlated with time as during steady-state recording conditions. The resulting errors are ordinarily attributable to the mechanisms employed for shifting from one speed to another, usually including inherent time delays in operation, backlash, inertia and friction.

SUMMARY OF THE INVENTION

This invention provides a multiple speed drive adapted for rapid selection of any one of a desired plurality of accurately predetermined speeds, through the use of a relatively simple spur gear train mounted on shafts rotating at differing speeds. The output or power take-off includes a second train of mutually engaged spur gears, one of which is freely turnable on each of the shafts and each of which is provided with a clutch for selective engagement with its corresponding shaft. By this means the takeoff gear train may be driven by any selected one of the shafts.

In addition to the foregoing, further speeds are made available by providing plural drive means for the shafts. The drive motors are continuously rotating, and overrunning clutch means are provided to permit a lower speed drive to remain connected to the shaft train while a higher speed drive has clutch means for disengagement or engagement to drive the shafts.

BRIEF DESCRIPTION OF THE DRAWING

FIG. 1 is a view in plan showing the principal components of a multiple speed drive according to this invention, developed in a single line for ease of description.

FIG. 2 is a partial plan view in section showing details of the clutch construction.

FIG. 3 is an elevation in section taken on line 3—3 of FIG. 1 showing details of the overrunning clutch.

FIG. 4 is a plan view showing mounting means adapted for steering the strip chart.

DESCRIPTION OF THE PREFERRED EMBODIMENT

The illustrated and preferred embodiment of a multiple speed paper chart drive according to this invention is mounted in a fixed frame 12 partially shown in FIG. 4. Within this frame is mounted a multiple speed drive mechanism shown generally at 14. A flat deck plate (not shown) is fastened to the frame and lies parallel to the plane of the paper as viewed in FIG. 4. An output shaft 16 shown in FIGS. 1 and 4 has a knurled metal paper drive wheel 18 secured to it, and a portion of the periphery of the wheel 18 protrudes through an opening in the deck plate in a conventional manner. Also protruding through this opening is a pivotal arm 20 having a spindle on which a rubber-covered pressure wheel 22 is freely turnable. A spring (not shown) attached to the arm 20 continuously urges the pressure wheel 22 against the wheel 18. As is common in such drives, the nip of the wheels 18 and 22 lies within the plane of or slightly above the surface of the deck plate. It will be understood that suitable means are also provided to support a supply of sheet material such as paper on one side of the nip so that the latter may draw the sheet material continuously from the supply source, and paper guides are mounted on the plate for delivering the sheet material to conventional take-up means or a hopper or basket at the other side of the mechanism. Suitable recording means of any desired type, such as a recording pen, are mounted on the frame 12 above the deck plate.

The mechanism 14 is supported between parallel frame plates 24 and 26 (FIG. 1) which are held in rigidly spaced relationship by transverse tie plates, bars or the like omitted from the drawing for the purpose of clarity in description. The frame thus formed is supported within the main frame 12 by a number of screws 28 passing through a mounting flange on the plate 24 and also through holes in a flat perforated metal spacing strip 30. The plate 26 bears an angle member 34 and has a flange on which is mounted a threaded bushing 32. An elongated steering adjustment screw 36 is threaded in the bushing 32 and supported within a hole in the member 34 opposite an opening 38 in the frame. A screw driver 40 may be inserted through the opening 38 to turn the screw until its end abuts the surface of the frame 12.

The angle formed between the main part of the plate 24 and its mounting flange is obtuse, whereby the plate tends to move toward the position illustrated by phantom lines 42. However, it is sprung back to the position shown in solid lines by the abutment of the screw 36 against the frame 12. Phantom lines 44 represent the limiting position of the plate 24 when the screw is threaded into the bushing to the point at which the flange on the plate 26 abuts the head of a stop screw 46 affixed in the frame 12. By this means the entire drive mechanism 14, including both the wheel 18 and the wheel 22, is rotated in relation to the frame 12 and its paper guides for proper alignment of the paper or other strip chart in use.

We turn next to a detailed description of the multiple speed drive 14 for the output shaft 16. The plates 24 and 26 have bearings for a number of parallel shafts 48, 50, 52, 54, 56, 58, 60 and 62, all parallel to the shaft 16. In addition, the plate 24 supports a high speed motor M1 and a lower speed motor M2. The plate 26 fixedly supports the magnet housings of a number of clutches including a speed range clutch RC and speed clutches SC1, SC2, SC3, SC4, SC5 and SC6. The clutches are all preferably constructed in an identical manner illustrated in detail in FIG. 2, except that the clutch RC is mounted on an extender 64 to space it from the plate 26. All of the shafts 52, 54, 56, 58, 60 and 62 are mutually engaged through a train of spur gears respectively keyed to them and designated generally at 66. The numbers of teeth on the respective gears are arranged to provide a suitable progression of speeds. For example, the drawing illustrates shafts having speeds of 100, 50, 25, 10, 5 and 2.5 times of given reference speed, such as millimeters per minute.

The shafts 52 to 62 also support a second train of spur gears designated generally at 68 which are mutually engaged and freely turnable on their respective shafts. These comprise the take-off gear train connected to the shaft 16. In the preferred embodiment these gears have equal numbers of teeth. A spur gear 70 keyed on the shaft 16 is engaged with this gear train.

To rotate the shaft 16 at a selected speed, a selected one of six switches, S1, S2, S3, S4, S5 and S6 is depressed to energize a corresponding speed clutch, for example the clutch SC2, thereby engaging the corresponding gear 72 with the shaft 54 and causing all of the gears in the train 68 to rotate at the speed of this shaft. Thus the gears in the train 68 may be rotated at the speed of any one of the shafts 52 to 62, depending upon which of the switches S1 to S6 is depressed. It is preferable to provide suitable interlocking means to prevent closure of more than one of these switches at a time.

A single motor may be used to rotate all the shafts through the gear train 66, but preferably two motors are used in order to obtain two speed ranges, for example a range measured in millimeters per minute and a range measured in millimeters per second. The range is determined by whether a range switch RS is open or closed. With this switch in the open position, the train 66 is driven by the motor M2 through an overrunning clutch 74, shown in detail in FIG. 3, and spur gears 76 and 78. When the switch RS is closed the clutch RC is energized and a gear 80 which is freely turnable on the shaft 50 is engaged therewith. This permits the motor M1 to drive the train 66 through spur gears 82 and 84 respectively keyed on the shafts 48 and 50. The motor M1 rotates the shaft 54 at a higher speed than does the motor M2, and therefore the clutch 74 is then overrunning and does not take power from the motor M2. Details of the clutch 74 are further described below.

As indicated in the drawing, both motors and all of the clutches are electrically grounded on one side of their respective windings. Further, the motors M1 and M2 are continuously rotating during the operation of the drive mechanism, thus providing for a substantially instantaneous start-up at any selected speed.

Backlash in the mechanism is effectively prevented by means of a brake designated generally at 86. This comprises a drag bushing 88 keyed on the shaft 62 and a slightly flexible brake band 90 of nylon or similar material fastened to the plate 24 by a screw 92. The brake band 90 preferably takes the form of a drilled disk receiving the bushing 88 and having an adjustment screw 94 threaded into it in such manner as to permit distortion of the drill hole in the brake band to apply a selected amount of pressure to the bushing 88. It will be understood that various alternative forms of brake may also be employed.

Details of the overrunning clutch 74 are shown in FIG. 3. As these are well known in other applications, they will only be described briefly. The shaft of the motor M2 is shown at 96. This shaft is supported in the motor housing on bearing rollers 98. The shaft supports a sleeve 100 on clutch rollers 102 engaging stepped, tapered inner wall surfaces of the sleeve 100. The shaft 96 continuously rotates in the direction of the arrow, causing the clutch rollers 102 to roll toward restricted spaces between the sleeve 100 and shaft 96, thereby engaging the sleeve 100 and rotating it. The gear 76 is keyed to the sleeve 100 and delivers power to the gear train 66.

When the clutch RC is engaged the motor M1 drives the gear train 66, and the resultant speed of the gear 78 is such as to turn the sleeve 100 in the direction of the arrow in FIG. 3 at a faster rate than it turns when driven by the motor M2. In this case the rollers 102 move away from the restricted spaces between the sleeve 100 and shaft 96 and therefore the latter does not deliver power to the sleeve. It has been found that this arrangement has important advantages in a variable speed drive because of the rapidity with which power may be transferred between the motors M1 and M2 when the speed range is shifted.

It will be evident that the total number of speeds available equals the products of the number of shafts in the train 66 (six in the illustrated case) and the number of motors (two in the illustrated case).

Details of the construction of the clutches are shown in FIG. 2, taking the clutch SC2 as an example. The fixed part of this clutch comprises a generally cylindrical recessed magnet housing 104 in which is received an electromagnet coil 106. The shaft 54 is received in a bearing 108 mounted in the plate 26. A set screw 110 fastens a rotor 112 to the shaft 54. The spur gear 72 is freely turnable on the shaft 54 and is retained by a split retainer ring 116 so that it may move a small distance toward or away from the rotor 112.

When the electromagnet 106 is energized, magnetic attraction draws the gear 72 into contact with the rotor 112, whereby the gear is engaged with the rotor and the shaft 54. When the electromagnet 106 is deenergized the magnetic field collapses and the gear 72 is again freely turnable on the shaft 54.

It has been found that this clutch constructive also provides important advantages in a multiple speed drive, since very little motion of the parts is required to engage or disengage the clutches. Accordingly, speed changes are accomplished in a matter of a very few milliseconds.

Various modifications of the structure described herein will suggest themselves to those skilled in this art. For example, while FIG. 1 shows the gear trains and shafts arrayed in a single line, other more compact arrangements may be provided such as a cluster of shafts having mutually parallel axes but arrayed in depth rather than in a single line. Other modifications in the configurations and arrangements of the parts will also occur to those skilled in this art after a reading of this specification, and these may be incorporated into a multiple speed drive without departing from the spirit or scope of this invention.

What is claimed is:
1. A multiple-speed drive having, in combination, a first shaft,
drive means for the first shaft including a first motor, a first clutch and gears completing a connection from said motor through said clutch to said shaft,
a second shaft parallel to and spaced from the first shaft,
a first gear train engaging said shafts for rotation at differing speeds,
drive means for the second shaft including a second motor, an overrunning clutch and gears completing a connection from said second motor through said overrunning clutch to said second shaft, said last-mentioned drive means being adapted to drive said second shaft at a speed lower than that produced by the first motor with the first clutch engaged,
a third shaft having a gear keyed thereto,
a second gear train engaged with said last-mentioned gear and including a gear freely turnable on each of said first and second shafts, and a clutch for each of said first and second shafts selectively operable to engage it with said gear freely turnable thereon.

2. The combination according to claim 1, in which the gears freely turnable on the first and second shafts have equal numbers of teeth.

3. The combination according to claim 1, in which the first gear train has mutually engaged gears on said first and second shafts with a ratio other than unity and the second gear train has mutually engaged gears on said first and second shafts with a ratio of unity.

4. A multiple speed drive having, in combination, a first shaft, drive means for the first shaft including a first motor, a first clutch and gears completing a connection from said motor through said clutch to said shaft, a second shaft parallel to and spaced from the first shaft, a gear train engaging said shafts for rotation at differing speeds, and drive means for the second shaft including a second motor, an overrunning clutch and gears completing a connection from said second motor through said overrunning clutch to said second shaft, said last-mentioned drive means being adapted to drive said second shaft at a speed lower than that produced by the first motor when the first clutch is engaged.

5. The combination according to claim 4 in which the motors are continuously rotating during operation of the drive.

References Cited

UNITED STATES PATENTS

| | | | |
|---|---|---|---|
| 2,356,590 | 8/1944 | Jacobsen | 74—661 |
| 2,875,875 | 3/1959 | Prähauser et al. | 192—84 |
| 2,944,440 | 7/1960 | Pamphilon | 74—661 |
| 2,972,916 | 2/1961 | Morgan | 74—661 XR |
| 3,054,489 | 9/1962 | Fahlberg | 192—45 |
| 3,072,233 | 1/1963 | Moo | 192—45 |
| 3,110,880 | 11/1963 | Fieser et al. | 74—342 XR |
| 3,127,790 | 4/1964 | Howey | 74—661 |
| 3,315,860 | 4/1967 | Adams et al. | 74—661 XR |
| 3,377,876 | 4/1968 | Finke et al. | 74—661 XR |

ARTHUR T. McKEON, Primary Examiner

U.S. Cl. X.R.

226—188; 74—359